(12) United States Patent
Wobben

(10) Patent No.: US 6,197,191 B1
(45) Date of Patent: Mar. 6, 2001

(54) DEVICE FOR FILTERING AND SEPARATING FLOW MEDIA

(76) Inventor: Aloys Wobben, Argestrasse 19, 26607 Aurich (DE)

( * ) Notice: Subject to any disclaimer, the term of this patent is extended or adjusted under 35 U.S.C. 154(b) by 0 days.

(21) Appl. No.: 09/077,844

(22) PCT Filed: Dec. 4, 1996

(86) PCT No.: PCT/EP96/05416
§ 371 Date: Sep. 25, 1998
§ 102(e) Date: Sep. 25, 1998

(87) PCT Pub. No.: WO97/20621
PCT Pub. Date: Jun. 12, 1997

(30) Foreign Application Priority Data

Dec. 4, 1995 (DE) .............................. 195 44 960

(51) Int. Cl.$^7$ .................................................. B01D 63/08
(52) U.S. Cl. .................................. 210/232; 55/521; 96/4; 210/321.84; 210/321.86
(58) Field of Search .......................... 210/321.6, 321.74, 210/321.75, 321.76, 321.83, 321.84, 321.85, 456, 488, 483, 232, 321.86, 321.77, 321.78, 321.79, 321.8, 321.87, 321.88, 321.89; 55/521; 96/4

(56) References Cited

U.S. PATENT DOCUMENTS

| | | |
|---|---|---|
| 3,456,805 | * 7/1969 | Jarvis et al. .................... 210/321.85 |
| 3,881,897 | 5/1975 | Faure et al. . |
| 4,789,480 | * 12/1988 | Bruschke .................... 210/321.85 |
| 4,861,476 | * 8/1989 | Kohlheb et al. ............... 210/321.85 |
| 4,892,657 | 1/1990 | Mohn et al. .................... 210/321.84 |
| 4,944,877 | * 7/1990 | Maples .......................... 210/321.74 |
| 5,069,789 | 12/1991 | Mohn et al. .................... 210/321.84 |
| 5,126,045 | * 6/1992 | Kohlheb et al. ............... 210/321.85 |
| 5,141,031 | * 8/1992 | Baurmeister ................... 210/321.79 |

FOREIGN PATENT DOCUMENTS

| | | |
|---|---|---|
| 37 15 183 | 9/1990 | (DE) . |
| 0 289 740 | 11/1988 | (EP) . |
| 0 396 853 | 11/1990 | (EP) . |
| 2 207 747 | 6/1974 | (FR) . |
| 1 790 985 | 1/1993 | (SU) . |
| WO 92/03217 | * 3/1992 | (WO) . |

* cited by examiner

*Primary Examiner*—Joseph W. Drodge
(74) *Attorney, Agent, or Firm*—Altera Law Group, LLC

(57) ABSTRACT

The invention concerns an apparatus for filtering and separating flow media by reverse osmosis or ultrafiltration, in particular for water desalination and water purification, wherein there are provided a housing (10) having at least one feed (14a) for the flow medium to be filtered or separated and at least one respective discharge (14b, 20a) for the permeate and the concentrate, and a filter device (30). The filter device is formed by a flat filter element (30) which is arranged in the housing (10) and which is disposed in a back and forth meander configuration in the housing (10) forming at least one flow channel (K1, K2) for the flow medium to be filtered or separated.

31 Claims, 4 Drawing Sheets

Figure 1:
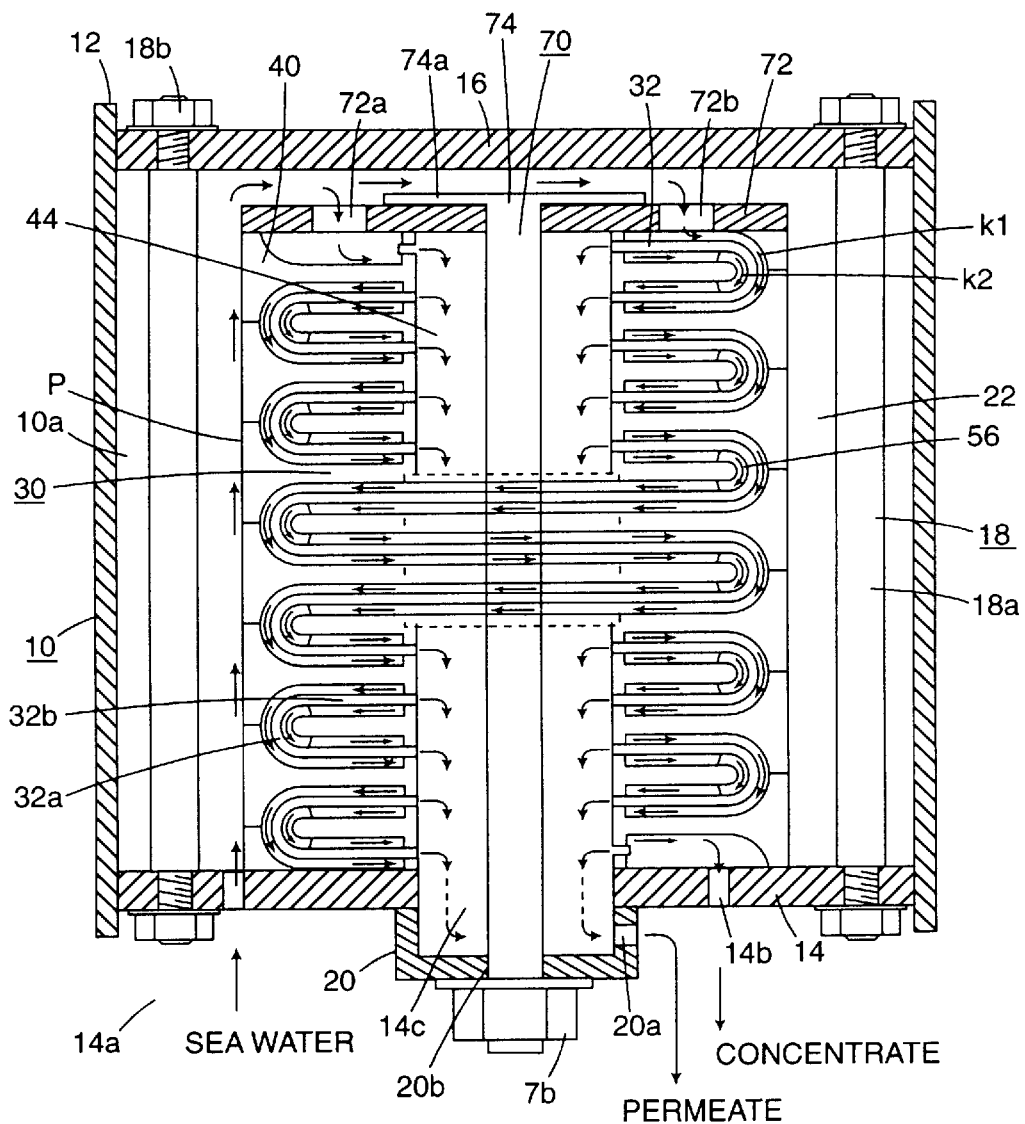

Fig. 10
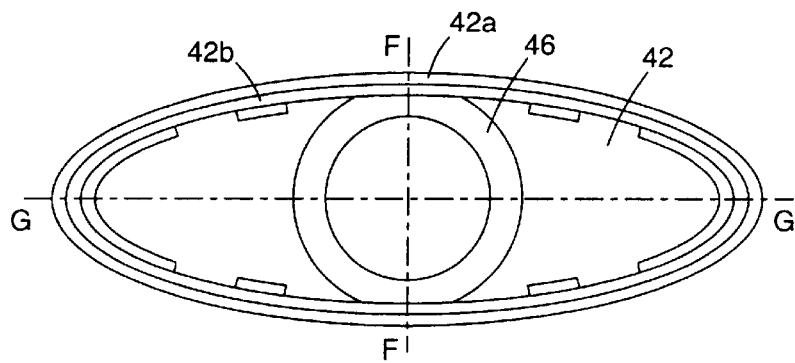
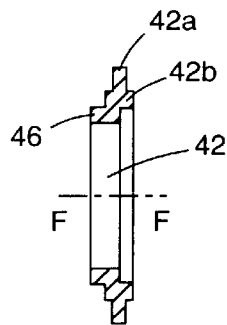
Fig. 10a
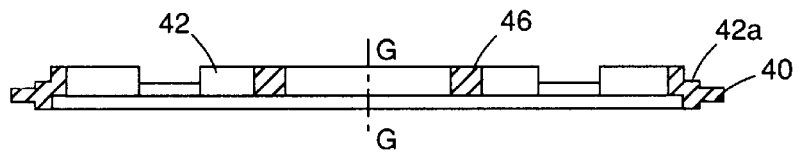
Fig. 10b

DEVICE FOR FILTERING AND SEPARATING FLOW MEDIA

This application is a 371 of Application PCT/EP96/05416, filed on Dec. 4, 1996.

The invention concerns an apparatus for filtering and separating flow media, in particular for sea water desalination and water purification by reverse osmosis and ultrafiltration as set forth in the classifying portion of claim 1.

In practice apparatuses of that kind are referred to as modules. In that respect hollow fiber modules, spiral winding modules and plate modules are known. For example DE 37 15 183 C2 discloses a plate module which corresponds to an apparatus of the kind set forth in the opening part of this specification. The essential difference between the individual modules lies in their structure, in particular in the position and the design of the filter device in the module and the capability of filtering or separating a raw or untreated water with a degree of contamination or fouling (Solid Density Index (SDI)) without the risk of blockage. In that respect the known plate modules involve the lowest level of risk of a blockage. It is therefore possible to forego preliminary purification involving the addition of chemicals. The SDI-value in the plate module can be at a maximum up to 20. The disadvantage of a plate module is inter alia individual production of the membrane plates and a very high proportion of waste in terms of membrane material. Furthermore due to a large number of changes in direction plate modules suffer from higher pressure drops and a lower ratio in respect of filter element surface area to module volume, in comparison with hollow fiber and spiral winding modules. Finally the production processes for same, in particular also because of the above-mentioned high proportion of waste in terms of filter element material, are comparatively expensive so that the production costs for plate modules of that kind are also high.

In comparison therewith the hollow fiber and spiral winding modules have a high ratio of filter element surface area to module volume and can be produced at low cost. However, an SDI-value of only between 1 and 3 is possible for hollow fiber modules and an SDI-value of between 3 and 5 is possible for spiral winding modules. Therefore preliminary cleaning by the addition of chemicals is necessary when using such modules.

SU-A-1 790 985 discloses an apparatus for filtering and separating flow media wherein a flat filter element is provided in a housing. That filter element is arranged in a meander configuration in the housing, forming a plurality of flow channels for the flow medium to be filtered. In that arrangement the flow channels extend in a straight line. In the known apparatus therefore the filter element is not used in the direction-changing regions of its meander configuration so that overall large parts of that filter element cannot be used for the filtration procedure.

The object of the present invention is to provide an apparatus of the kind set forth in the opening part of this specification, which can be inexpensively produced with a high level of efficiency in regard to separation and filter effectiveness.

The foregoing object is attained by the features of claim 1. The proposed structure permits only one single flat or surface filter element being required per apparatus or module. That makes it possible for the production costs of an apparatus of that kind to be quite considerably reduced as the operations which are necessary in connection with known apparatuses such as cutting to size the individual flat surface elements intended for a module and arranging them in the housing can be eliminated. Furthermore the flat element is put to more effective use as the filtering or separation process can take place uninterruptedly along the flow path of the flow medium to be treated. Filtration or separation can be effected even in the regions of the change in direction of the flow medium to be treated.

The arrangement of the flat filter element which extends in a meander-like configuration can be such that the flow medium to be treated is disposed along the flat filter element which is arranged in a meander shape, only on one surface side of the element, that is to say there is only a single flow channel or duct. In order to make better use of the flat filter element of a meander configuration however it can also be arranged in such a way that the flow medium to be treated flows along both sides thereof, that is to say there are two flow channels.

The orientation of the flat filter element extending in a meander configuration, in the housing, can be freely selected. In particular the region of the change in direction can be adapted to the respective circumstances involved. A particularly simple structure for the apparatus overall can be achieved if the flat filter element which extends in a meander configuration is accommodated in the housing substantially perpendicularly to the longitudinal axis of the housing, with the surfaces of the element extending in at least approximately mutually parallel relationship.

Furthermore, for the purposes of better stabilisation of the meander arrangement of the flat filter element and for the formation of the flow channel or channels, there can be provided in succession a plurality of carrier plates which form a spacing between them and which extend in substantially mutually parallel relationship. This carrier plates accommodate between them the flat filter element which is arranged in a meander configuration.

So that the change in direction of the flat filter element which is arranged in a meander configuration can occur in a uniform fashion and so that the filter element is supported in that situation, a carrier plate can be provided at one end edge with a direction-changing means for the flat filter element which is disposed in a meander configuration. In that arrangement, the direction-changing means can be such that it defines a direction-changing radius, which is large in relation to the plate thickness, for the flat filter element which is arranged in a meander configuration.

The direction-changing means may be formed for example by at least one direction-changing body which is provided at the end edge and which projects beyond the plate surface. So that the flow of the flow medium is disturbed as little as possible, it can further be provided that disposed along the end edge are a plurality of direction-changing bodies which are preferably arranged at equal spacings and which can be comparatively small, depending on the size of the carrier plate or the length of the end edge.

In order to be able to discharge the permeate from the apparatus, provided in the center of each carrier plate is an opening substantially perpendicular to the plane of the plate and which serves for the permeate discharge. So that the flow of the flow medium to be treated through the opening is disturbed as little as possible, it can further be provided that the opening is of an elliptical cross-section as considered in the plane of the plate.

That opening can be used at the same time for the arrangement of a clamping or tightening device which presses against each other the pack comprising the flat filter element arranged in a meander configuration and the optionally provided carrier plates. That clamping device can be formed by two respective flange elements which are tightened towards each other by way of a clamping bolt with an optionally provided screwthread and a nut. The opening can serve to receive the clamping bolt, while a guide ring can be provided in the opening, the inside diameter of the guide ring approximately corresponding to the ellipse along the shorter main axis.

So that the flow medium to be treated cannot flow on its way through the one flow channel in between the carrier plate and a flat or surface side of the flat filter element arranged in a meander configuration, it can further be provided that, at least at one of the two surface sides of the carrier plate, the opening has an edge which projects beyond the plane of that carrier plate and which completely surrounds the opening. In that case, the edge can be of such a configuration that it passes through the flat filter element which is arranged in a meander configuration, and is connected to the next following carrier plate.

In that arrangement, the opening can be so disposed in the carrier plate that its longer main axis extends approximately parallel to the flow direction or perpendicularly to the end edge of the carrier plate, which end edge carries the direction-changing means.

So that the flow medium to be treated cannot flow into the opening, it can further be provided that the opening is provided with a groove extending around the opening, for receiving a sealing element, preferably an O-ring.

To make it easier for the carrier plates to be stacked in mutually superposed relationship, with the provision of a spacing between them, it can further be provided that the end edge of the carrier plate, which is disposed opposite to the end edge having the direction-changing means, has a spacing means which projects beyond both flat surface sides of the carrier plate. In that arrangement the spacing means can be formed by a land or flange portion which projects beyond both surface sides. In that case the spacing means may be formed by a land or flange portion projecting beyond both surface sides.

In order to facilitate assembly of the apparatus according to the invention, it can further be provided that a portion of the spacing means, which projects at one surface side, has at least a first adjusting element, and the portion of the spacing means, which projects at the other surface side, has a second adjusting element which is of such a construction that a carrier plate with its second adjusting element is adjusted at the next-but-one carrier plate at the first adjusting element thereof, possibly with the interposition of a sealing element. Preferably the end edges of a carrier plate, which connect the end edge having the direction-changing means to the end edge having the spacing means, have an edge which projects beyond both surface sides of the carrier plate and the height of which is less than that of the spacing means.

In that arrangement, the carrier plates can be accommodated in succesion in the housing with end edges arranged turned through 180° in the plane of the plates, that is to say, an end edge with a spacing means is followed by an end edge with the direction-changing means, and so forth.

In order to prevent flow break-away due to different speeds of the flow medium to be treated, it can further be provided that the cross-section of a flow channel is constant from the center of the opening, downstream of the opening. In other words, care is taken to provide that the cross-section of the flow channel, which is reduced by virtue of the opening relative to the entry side at a carrier plate, remains constant in terms of its cross-section. As the width of the channel enlarges again after the opening, consequently at the same time the height is reduced so that the cross-section remains constant. Likewise, it is possible to provide a depression in the carrier plate downstream of the opening, which depression is raised again to the original level of the plane of the plate downstream of the center of the opening, thereby also providing for a constant flow cross-section.

The filter element can in turn be of a quite different configuration. It is particularly advantageous if the filter element is a membrane pad or cushion which is preferably an edge-welded, doubled membrane.

It can preferably also be provided that the carrier plate is provided at one or both surface sides thereof with turbulators respectively projecting out of the plane of the plate. In this case the turbulators can be arranged in columns and rows, being disposed in mutually displaced relationship with each other in successive columns and rows. In this case the shape of the turbulators may be selected as desired, a shape which is particularly advantageous in terms of flow being achieved by virtue of the turbulators being of an elliptical configuration.

Any desired shape can be adopted for the carrier plate. It is particularly advantageous if the carrier plate is of a rectangular and in particular a square configuration. Furthermore the support width of the carrier plate can be adapted to the web width of a flat filter element.

To produce a flat filter element, the double membrane can be welded over the entire length for an apparatus in one working operation in a machine. As the second working operation, the opening is then stamped out by a round steel member which is adapted to the shape of the opening being caused to penetrate into the welded membrane when it is fitted in the machine. That can provide for a particularly advantageous mode of manufacture.

Figure 2:
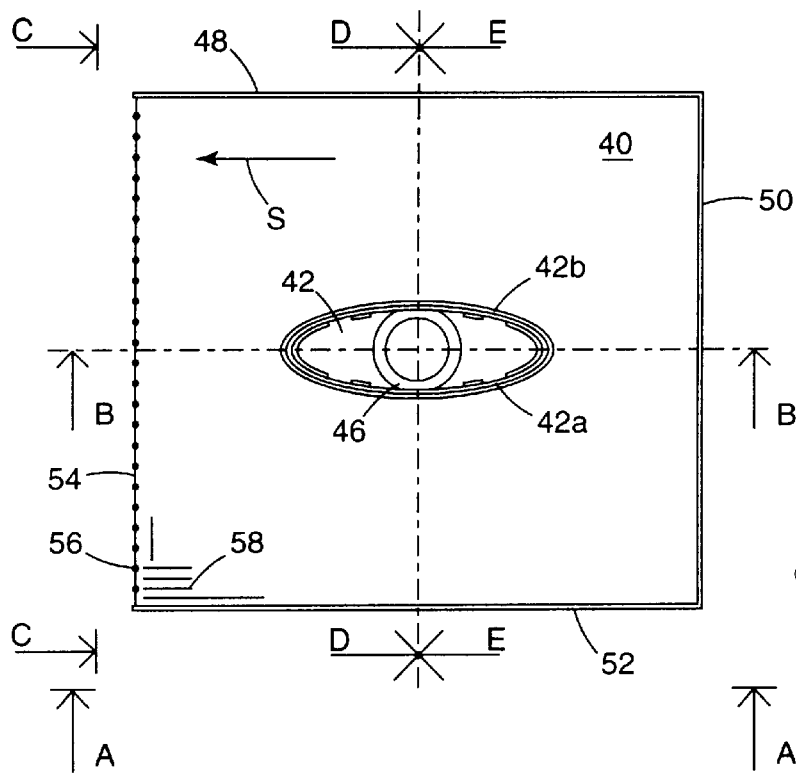
Figure 3:
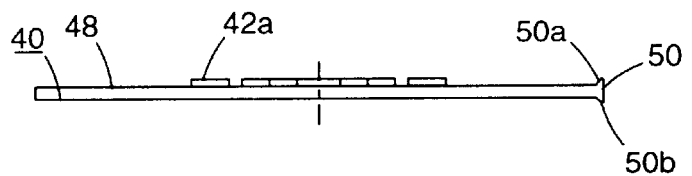
Figure 4:
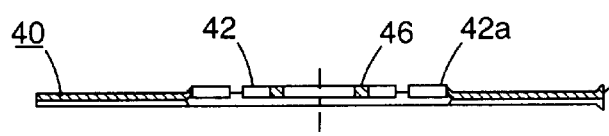
Figure 5:
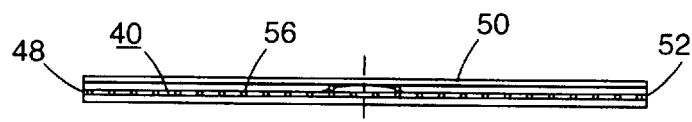
Figure 6:
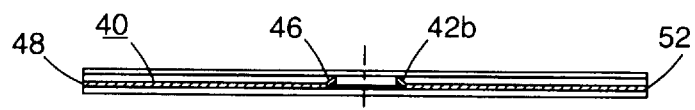
Figure 7:
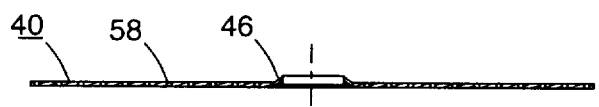
Figure 8:
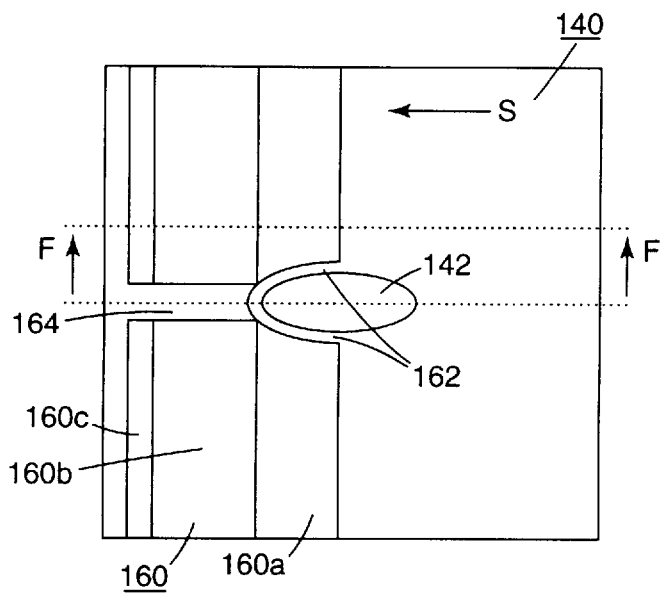
Figure 9:
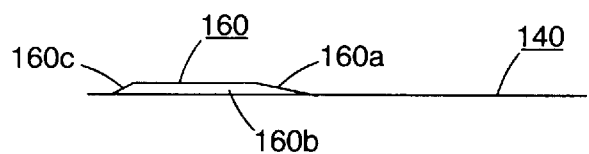

Further advantageous configurations and an embodiment are described hereinafter with reference to the drawings in which:

FIG. 1 is a diagrammatic view in longitudinal section through an apparatus according to the invention, FIG. 2 is a view from above on to a carrier plate used in FIG. 1, FIG. 3 is a view of the carrier plate along a line A—A in FIG. 2, FIG. 4 is a section through the carrier plate along the line B—B in FIG. 2, FIG. 5 is a side view of the carrier plate along the line C—C in FIG. 2, FIG. 6 is a section through the carrier plate along the line D—D in FIG. 2, FIG. 7 is a section through the carrier plate along the line E—E in FIG. 2, FIG. 8 is a diagrammatic view from above of a further embodiment of a carrier plate, and FIG. 9 is a section along line F—F in FIG. 8.

FIG. 10, FIG. 10*a* and FIG. 10*b* are several views on a through opening being provided in said carrier plate according to FIG. 2.

The apparatus diagrammatically illustrated in FIG. 1 includes a housing 10, a flat filter element 30 arranged in the housing in a meander configuration, a plurality of carrier plates 40 which receive the flat filter element 30 forming flow passages or channels between them, and a clamping or tightening device 70.

The housing 10 is formed from a tube portion 12 which is open at both ends. At its lower end in FIG. 1, the tube portion 12 is closed by a first end flange 14 while at its end which is the upper end in FIG. 1 it is closed by a further end flange 16. The two end flanges 14, 16 are pressure-tightly fitted into the tube portion 12 and are clamped or tightened towards each other by clamping or tightening devices 18.

The clamping devices 18 are formed by a plurality of screw bolts 18a which are arranged along the cross-section of the tube portion 12 and which pass through the two end flanges 14, 16. At their ends the tightening bolts 18a have screwthreads on to which respective nuts 18b are screwed from the outside of the tube portion 12.

The lower end flange 14 has a feed flow opening 4a for the flow medium to be treated or filtered, in this case sea water. The lower end flange 18 also has a discharge flow opening 14b for the concentrate which is produced by the filtration or reverse osmosis effect. In addition, at its center, the lower end flange 14 is provided with a larger opening 14c which is provided for receiving the permeate and for the discharge flow thereof. That larger opening 14c is closed by an end cover housing 20 which in turn has a through opening 20a for the permeate. Finally the cover housing 20 also has a further through opening 20b for the clamping device 70 which is described in greater detail hereinafter.

The flat filter element 30 which is arranged in a meander configuration in the housing 10 is a membrane pad or cushion formed by a doubled, edge-welded membrane. The filter element 30 is held in its meander configuration in the interior of the housing 10 by the carrier plates 40.

As can be seen from FIGS. 2 through 7, a carrier plate 40 is of a rectangular, in particular square shape. Provided in the center of the carrier plate 40 is a substantially elliptical through opening 42 for the discharge flow of the permeate produced. In this arrangement, the orientation of the longer main axis of the ellipse of the through opening 42 extends substantially parallel to the direction of flow of the flow medium which flows along the carrier plate 40. The through opening 42 has an edge 42a which projects out of the plane of the plate, at a flat surface side of the carrier plate 40, beyond the plane of the plate. The edge 42a extends entirely around the through opening 42. Furthermore the edge 42a is provided to receive a sealing element (not shown), preferably in the form of an O-ring, which prevents the flow medium which is to be separated or filtered from flowing into the through opening 42 which in fact serves as the discharge for the permeate.

As can be seen in particular from FIGS. 2 and 4 the through opening 42 is further provided with a ring 42b whose inside diameter approximately corresponds to the diameter of the elliptical opening 42 along the shorter main axis thereof. The ring 42b serves for guiding and receiving the tightening device 70 which is described in greater detail hereinafter.

As can further be seen from FIGS. 2 through 7, the carrier plate 40 is provided with an edge land or flange portion 44–48 which extends along three end edges or longitudinal edges respectively of the carrier plate 40 and which projects beyond the respective plane of a flat surface side, substantially perpendicularly to that plane. The edge flange portion 46 which extends substantially perpendicularly to the main axis of the elliptical opening 42 or transversely with respect to the flow direction S is of greater vertical height in comparison with the other two edge flange portions 44, 48 and the edge 42a of the elliptical through opening 42 (see also FIGS. 10, 10a and 10b).

As can be seen from FIGS. 3 through 6, at its end which is the upper end in FIGS. 3 through 6, the edge flange portion 46 is of an L-shaped configuration and thereby forms a first adjusting element 46a. The other end which is the lower end as viewed in FIGS. 3 through 6 is also of an L-shaped configuration and forms a second adjusting element 46b. The two adjusting elements 46a, 46b serve later for alignment and orientation of carrier plates 40 which are arranged in succession one upon the other, wherein the adjusting element 46b of a preceding carrier plate 40 engages into the adjusting element 46a of the next-but-one carrier plate 40, as will be described in greater detail hereinafter (see also FIGS. 10 10a and 10b).

The edge 50 of the carrier plate 40, which is disposed downstream of the elliptical through opening 42, does not have a shaped end portion. Instead, provided at the edge 50 are a plurality of direction-changing means 53 which are arranged at uniform spacings relative to each other and which project out of both planes of the two surface sides of the carrier plate 40. That causes a change in the direction of the filter element 30, with a radius which is large in relation to the thickness of the plate.

As can be seen from FIG. 2, provided at both surface sides of the carrier plate 40 are turbulators 54 which are arranged in rows and columns, wherein the turbulators are arranged in displaced relationship from one another from mutually successive rows or columns.

As can be seen from FIG. 1 the carrier plates 40 are arranged in succession turned respectively through 180° in the plane of the plates. In that situation the adjusting devices 46a and 46b respectively of the first and the third and correspondingly following carrier plate 40 engage into each other. In this arrangement, it is possible for a seal to be provided between the respective adjusting devices 46a and 46b respectively, which seal can also be arranged at the edge flange portions 44 and 48 respectively. As can also be seen from FIG. 1, two successive carrier plates 40 which are respectively rotated relative to each other through 180° do not completely overlap each other so that the end edge which has the edge flange portion 46 of the one carrier plate projects beyond the end edge, which has the direction-changing means 52, of the subsequent carrier plate 40. By virtue of that arrangement, a completely closed space is formed by the edge flange portions 46 and 48 respectively, wherein the filter element 30 which is accommodated between two successive carrier plates forms an upper and a lower flow passage or channel K1 and K2 respectively. In other words, a flow channel K1 is formed firstly by the underside of a preceding carrier plate and then by the top side of the subsequent carrier plate, and throughout by the filter element 30 arranged in a meander configuration.

The clamping device 70 is formed by an end plate 72 and a bolt 74 which passes through the end plate 72. The bolt 74 in turn has a clamping flange 74a which bears against the outside of the end plate 72. The clamping bolt 74 passes entirely through the tube portion 12 of the housing 10 and issues from the housing 10 at the cover means 20. At that end the clamping bolt 74 has a screwthread on to which a nut 76 can be screwed. By virtue of that arrangement, a compact pack or unit can be formed from the carrier plates 40 which are arranged in succession in mutually displaced relationship through 180°, and the filter element 30 accommodated therebetween. The end plate 72 has two through openings 72a and 72b respectively for the feed flow of the flow medium to be treated. As FIG. 1 also shows, the pack formed from the carrier plates 40 and the filter element 30 is of such an outside diameter that it is smaller than the inside diameter of the tube portion 12. A flow path for the flow medium to be treated is thereby formed along the pack.

As illustrated by the arrows in FIG. 1, the flow medium to be treated passes into the interior of the housing 10 through the feed flow opening 14a, and in the interior of the housing 10 flows along the pack to the opposite end of the housing 10, which is formed by the end flange 16. There, the medium to be treated passes through the openings 72a and 72b respectively into the interior of the pack formed from the carrier plates 40 and the filter element 30. In that case, it passes into the two flow channels K1 and K2 respectively and into the interior of the filter element 30. The permeate which is produced by filtration or reverse osmosis passes out of the filter element 30 by way of the elliptical through opening 42 into the interior of the pack and flows to the exterior by way of the outlet 20a in the cover means 20. The flow medium which is not yet further treated also flows in a meander configuration along the two flow channels K1 and K2 entirely through the apparatus according to the invention, while permeate proportions which have already been produced again pass by way of the respective through opening 43 into the interior of the pack. At the end of the meander-shaped flow channels K1, K2, the concentrate which has remained is discharged from the apparatus according to the invention by way of the outlet opening 14b.

FIGS. 8 and 9 show an alternative embodiment of a carrier plate 40. In this respect, the same components are denoted by the same references, each increased by one hundred.

The carrier plate 140 shown in FIGS. 8 and 9 has a raised portion 160 downstream of the center of the elliptical through opening 142. The raised portion 160 serves to keep the cross-section constant downstream of the center of the elliptical through opening 142. As can be seen in particular from FIG. 9, the raised portion 160 has a ramp 160a, a horizontal portion 160b adjoining same, and a shorter ramp 160c. The longer ramp 160a and the shorter ramp 160c rise out of the plane 140 of the plate and lead back to same again.

The raised portion 160 is also divided into two and, together with the elliptical through opening 142, on both sides of the elliptical opening 142, forms two flow channels which combine to form a common flow channel 164 downstream of the elliptical through opening 142.

What is claimed is:

1. An apparatus for filtering and separating a flow medium configured to produce permeate and concentrate, comprising:
    a housing having at least one feed for the flow medium to be filtered and separated, and at least one respective discharge for the permeate and the concentrate, and
    a filter device having a flat filter element arranged in the housing in a back and forth meander configuration, the flat filter element forming at least one flow channel extending in a back and forth route for the flow medium to be filtered and separated.

2. An apparatus as set forth in claim 1 wherein the filter element has two surface sides and flow channels are formed at each surface side of the filter element.

3. An apparatus as set forth in claim 1 wherein the filter element is arranged in the housing substantially perpendicularly to a longitudinal axis of the housing and the filter element has mutually parallel surfaces.

4. An apparatus as set forth in claim 1 wherein in the housing a plurality of carrier plates is provided in the housing to hold the filter element, the carrier plates extending in substantially mutually parallel relationship and forming spaces between adjacent carrier plates, an end edge of a carrier plate being provided with a direction-changing means for the filter element arranged in the meander configuration.

5. An apparatus as set forth in claim 4 wherein the direction-changing means defines a direction-changing radius, large in relation to a thickness of the carrier plate, for the flat filter element arranged in the meander configuration.

6. An apparatus as set forth in claim 4 wherein the direction-changing means of the flat filter element arranged in the meander configuration is formed by at least one direction-changing body provided at the end edge, the at least one direction-changing body projecting beyond a plate surface.

7. An apparatus as set forth in claim 6 wherein a plurality of direction-changing bodies are arranged at uniform spacing along the end edge.

8. An apparatus as set forth in claim 4 wherein a second end edge opposite the end edge having the direction-changing means has a spacing means projecting beyond the planes of the two surface sides of the carrier plate.

9. An apparatus as set forth in claim 8 wherein the spacing means is formed by a flange portion projecting beyond the respective plate plane of the two surface sides.

10. An apparatus as set forth in claim 8 wherein a portion of the spacing means projecting at one surface side has a first adjusting means and a second adjusting means projecting from the other surface side configured to adjust at a first adjusting means of an adjacent carrier plate.

11. An apparatus as set forth in claim 8 wherein an edge of a carrier plate, connecting between the end edge having the direction-changing means and the second end edge having the spacing means, is provided with an edge portion projecting beyond the plate planes of both surface sides of the carrier plate, a height of the edge portion being less than a height of the spacing means.

12. An apparatus as set forth in claim 8 wherein the carrier plates are alternately arranged in succession with end edges arranged turned through 180° in the plate plane.

13. An apparatus as set forth in claim 4, wherein the carrier plate is provided with turbulators projecting out of a respective plane of the plate at at least one of the surface sides.

14. An apparatus as set forth in claim 13 wherein the turbulators are arranged in mutually displaced relationship in successive columns and rows.

15. An apparatus as set forth in claim 13 wherein the turbulators are substantially elliptical.

16. An apparatus as set forth in claim 1, wherein a plurality of carrier plates is provided in the housing for holding the flat filter element, the carrier plates extending in substantially mutually parallel relationship and forming spacings therebetween, each plate having an opening that extends substantially perpendicularly to a plate plane to discharge the permeate, the opening having an elliptical cross-section as considered in the plane of the plate.

17. An apparatus as set forth in claim 16 wherein a clamping bolt of a clamping device, the clamping bolt extending substantially perpendicularly to the plane of the plate and passing through the opening having a guide ring for the clamping bolt, a guide ring inside diameter approximately corresponding to an inside diameter of the elliptical opening along a minor axis of the ellipse.

18. An apparatus as set forth in claim 16, wherein the elliptical opening has an edge on at least one of the two surface sides of the carrier plate projecting beyond the respective plane of the plate and completely surrounding the elliptical opening.

19. An apparatus as set forth in claim 16 wherein a major axis of the elliptical opening is arranged in the carrier plate approximately parallel to a flow direction of the flow medium.

20. An apparatus as set forth in claim 16 wherein a groove provided around the elliptical opening to receive a sealing element.

21. An apparatus as set forth in claim 16 wherein a flow channel is formed between the filter element and a respective carrier plate to have a constant cross-section corresponding to the cross-section at the level of the center of the elliptical opening.

22. An apparatus as set forth in claim 21 wherein the carrier plate is provided with a raised portion for keeping the channel cross-section constant.

23. An apparatus as set forth in claim 22 wherein the raised portion rises from the center of the elliptical opening and drops back to the initial height shortly before reaching the end edge.

24. An apparatus as set forth in claim 22 wherein the raised portion has a channel along the elliptical opening and along the longer main axis of the elliptical opening.

25. An apparatus as set forth in claim 24 wherein a bottom of the channel is at the height of the plane of the plate before the raised portion.

26. An apparatus as set forth in claim 21 wherein the carrier plate has a depression to keep the channel cross-section constant.

27. An apparatus as set forth in claim 21 wherein the carrier plate is depressed before the center of the elliptical through opening.

28. An apparatus as set forth in claim 1, wherein the filter element is a membrane pad.

29. An apparatus as set forth in claim 28 wherein the membrane pad is a welded, doubled membrane.

30. An apparatus as set forth in claim 1, wherein the carrier plate is rectangular.

31. An apparatus as set forth in claim 1, wherein a width of the carrier plate is adapted to a width of a web of the filter element.

* * * * *